United States Patent
Faruque et al.

(10) Patent No.: US 8,152,224 B2
(45) Date of Patent: Apr. 10, 2012

(54) VEHICLE FRONT-END UPPER LOAD PATH ASSEMBLY

(75) Inventors: Omar Faruque, Ann Arbor, MI (US); Ari Garo Caliskan, Canton, MI (US); Michael M Azzouz, Livonia, MI (US); Edgar Edward Donabedian, Livonia, MI (US); Thierry Guimberteau, Livonia, MI (US); David Anthony Wagner, Northville, MI (US)

(73) Assignee: Ford Global Technologies, Dearborn, MI (US)

( * ) Notice: Subject to any disclaimer, the term of this patent is extended or adjusted under 35 U.S.C. 154(b) by 63 days.

(21) Appl. No.: 12/764,544

(22) Filed: Apr. 21, 2010

(65) Prior Publication Data
US 2011/0260501 A1  Oct. 27, 2011

(51) Int. Cl.
*B60N 99/00* (2006.01)
(52) U.S. Cl. ............... 296/187.09; 296/203.02
(58) Field of Classification Search ............. 296/203.01, 296/203.02, 187.03, 187.09
See application file for complete search history.

(56) References Cited

U.S. PATENT DOCUMENTS

| | | | |
|---|---|---|---|
| 4,078,840 A | 3/1978 | Itoh | |
| 6,679,545 B1 | 1/2004 | Balzer et al. | |
| 6,877,797 B2 * | 4/2005 | Henderson et al. | 296/203.02 |
| 7,025,410 B2 * | 4/2006 | Kosaka | 296/187.09 |
| 7,036,874 B2 | 5/2006 | Stojkovic et al. | |
| 7,066,533 B2 | 6/2006 | Sohmshetty et al. | |
| 7,284,788 B1 | 10/2007 | Barbat et al. | |
| 7,399,015 B2 | 7/2008 | Patel et al. | |
| 7,887,122 B2 * | 2/2011 | Baccouche et al. | 296/187.09 |
| 2004/0174047 A1 * | 9/2004 | Henderson et al. | 296/193.09 |
| 2004/0239149 A1 * | 12/2004 | Kosaka | 296/187.09 |
| 2005/0236827 A1 * | 10/2005 | Mouch et al. | 280/788 |
| 2006/0033364 A1 * | 2/2006 | Lee | 296/203.02 |
| 2009/0315364 A1 * | 12/2009 | Stojkovic et al. | 296/193.09 |

FOREIGN PATENT DOCUMENTS

| | | |
|---|---|---|
| EP | 1406808 B1 | 6/2006 |
| EP | 2045170 A2 | 4/2009 |
| JP | 2009166603 A2 | 7/2009 |
| WO | WO 2007058787 A2 | 5/2007 |

* cited by examiner

*Primary Examiner* — Lori Lyjak
(74) *Attorney, Agent, or Firm* — Gigette Bejin; Fredrick Owens

(57) ABSTRACT

A structure for transferring energy during an automotive front end impact includes an upper load path structure having a first shotgun rail a second shotgun rail and an upper radiator bar extending therebetween, a lower load path structure having a first side rail a second side rail and a lower support member extending therebetween. During an impact, the upper radiator bar is configured to transfer energy to the first and second shotgun rails, and the lower support member is configured to transfer energy to the first and second side rails during an impact.

7 Claims, 6 Drawing Sheets

VEHICLE FRONT-END UPPER LOAD PATH ASSEMBLY

BACKGROUND

The present disclosure relates generally to radiator support structures for automotive vehicles. In previous vehicle designs, including Body-on-Frame or Body-in-White designs, a front end frame assembly typically has a primary load path, including a frame or rail that provides support to a structural bumper member. In such designs, the vehicle typically a non-structural radiator support bracket is suspended above the primary load path by a non-structural upper fender rail assembly (also referred to as a shotgun assembly). The radiator support bracket and corresponding shotgun brackets are used to mount various vehicle components, such as the headlights, horn, fluid tanks and radiator, though are not configured to enhance the vehicle's crashworthiness. Traditionally, the shotgun assembly and associated radiator bracket are made from stamped sheet metal with an open cross-section. In the event of an impact occurring above the plane of the primary load path, this radiator support assembly is generally not intended to function as a primary structure for absorbing or transferring impact energy during a collision. Therefore, a need exists for an upper load path structure, including a structural radiator support bracket that may withstand an impact and transfer energy in a controlled manner to the remainder of the vehicle.

SUMMARY

A radiator support structure for a vehicle includes a first and second shotgun rail, a first and second side rail, a first vertical support element extending between the first shotgun rail and the first side rail, a second vertical support element extending between the second shotgun rail and the second side rail, and an upper radiator bar extending between the first shotgun rail and the second shotgun rail, where the upper radiator bar configured to transfer energy to the first and second shotgun rails during an impact. Additionally, in an embodiment, a lower support member may extend between the first and second side rails.

In an embodiment, the first and second shotgun rails, first and second side rails, first vertical support elements, and the upper radiator bar may be constructed from either closed-section or C-Channel elements. The upper radiator bar may be configured to transfer energy to the first and second shotgun rails during an impact, while the lower support member may be configured to transfer energy to the first and second side rails during such an impact.

In an embodiment, the first shotgun rail, second shotgun rail, and upper radiator bar may form an upper load path structure, while the first side rail, second side rail, and lower support member may form a lower load path structure. The upper load path structure and lower load path structure may be separated by a vertical support element that is configured to transfer energy between the two structures. The upper load path structure may be affixed to the A-pillars of the vehicle.

The upper radiator bar may be affixed to the first and second shotgun rails using a bolt attachment, and may further include an insert extending through a portion of the bar. In an embodiment, the first and second shotgun rails may each include a curved portion that extends toward the attached upper radiator bar. Such a curvature may provide the upper load path structure with an arch-like geometry.

DETAILED DESCRIPTION

Figure 1:
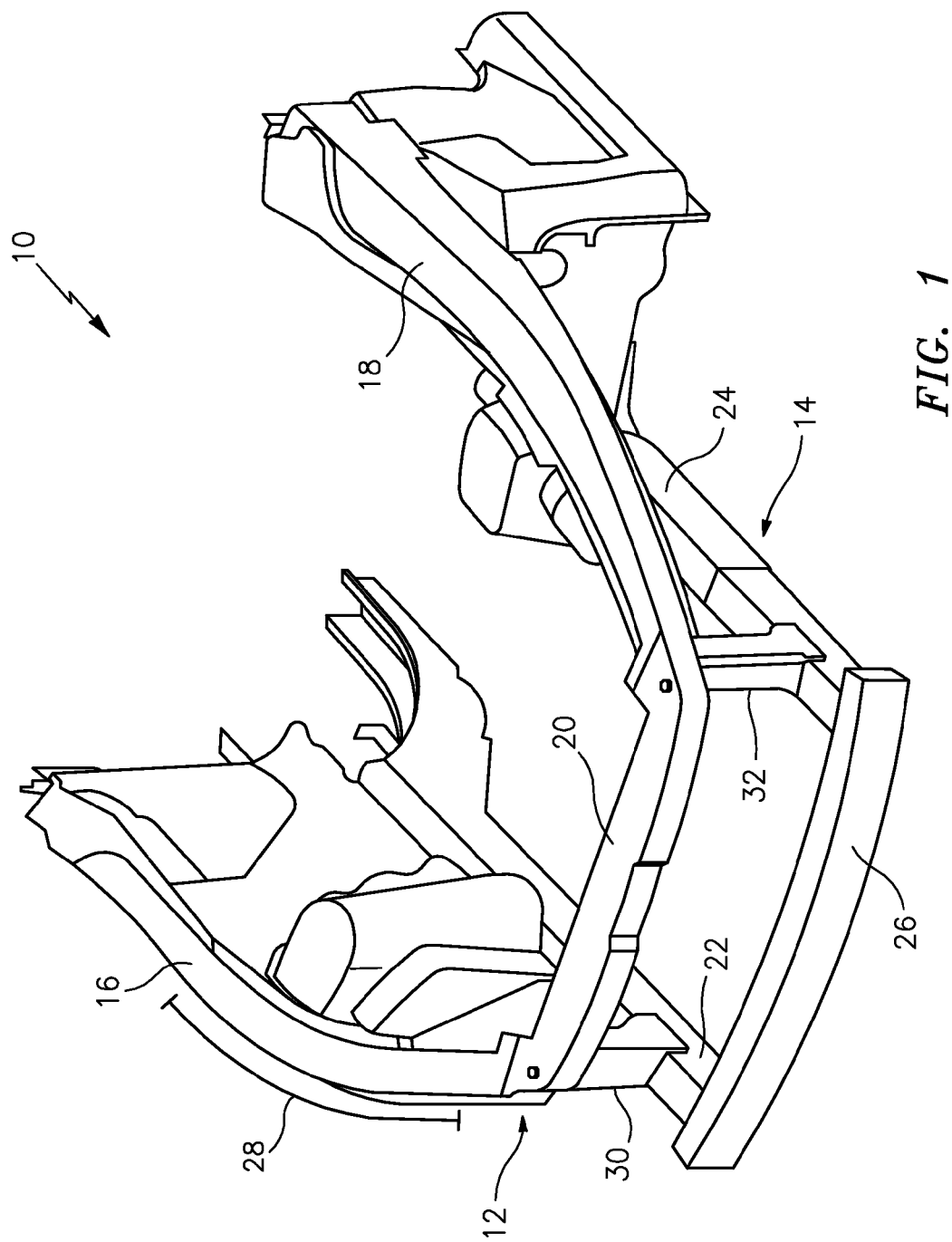
FIG. 1 is an isometric view of an automotive vehicle front end assembly including a radiator support structure.

Referring to the drawings, wherein like reference numerals are used to identify like or identical components in the various views, FIG. 1 generally illustrates a vehicle front end frame assembly 10 that includes an upper load path structure 12 and a lower load path structure 14. Without limitation, such a structural configuration may be used in a sedan or cross-over vehicle. In the event of a front end collision, each load path structure, 12, 14 is designed to transfer energy from the site of the impact in a controlled manner through the structure to the remainder of the vehicle. Such energy transfer may prevent a colliding vehicle or object from unintentionally intruding into the engine compartment of the vehicle. Additionally, either or both of the load path structures 12, 14 may include integrated crumple zones to allow the structure to controllably deform during an impact. As known in the art, crumple zones are portions of the body structure that use controlled deformation to prevent excessively rapid vehicle deceleration. To promote such controlled deformation, a crumple zone may include, for example, and without limitation, apertures or cavities formed on the surface of a body structure component.

In an embodiment, the upper load path structure 12 may include a first shotgun rail 16, a second shotgun rail 18, and a radiator support bar 20 extending therebetween. The radiator support 20, among other things, is intended to support the radiator and/or other associated cooling modules, and may additionally support other components such as the hood latch. The lower load path structure 14 may similarly include a first side rail 22, a second side rail 24 and a lower bumper support member 26 that extends between the first side rail 22 and the second side rail 24. The lower bumper support member 26 may extend within or just behind the vehicle's front bumper, and may be viewed as the primary load path during a frontal impact. In an embodiment, the radiator support bar 20 may be vertically aligned with the bumper support member 26. Alternatively, as illustrated in FIG. 1, the radiator support bar 20 may be set back from the bumper support member 26.

The upper load path structure 12 and lower load path structure 14 may be separated and held in vertical alignment by one or more vertical support elements (e.g., support elements 30, 32). Each vertical support element may further be configured to transfer energy between the upper and lower load path structures.

In an embodiment, the upper load path structure 12 may enhance a vehicle's crashworthiness by providing a secondary impact point to engage a colliding vehicle or object. This may be particularly beneficial to a smaller vehicle (such as, without limitation, a sedan or cross-over vehicle) during a frontal collision with a vehicle having a higher ride-height, such as an SUV or light truck. In this scenario, the difference in ride height may cause the primary load paths (i.e., bumpers) to be misaligned, and may further encourage the larger vehicle to over-ride the smaller vehicle. By including an upper impact point in the smaller vehicle, however, the upper load path structure 12 may engage the bumper of the higher-riding vehicle and discourage or prevent such over-riding. The upper load path structure 12 may additionally be beneficial in mitigating excessive intrusion during collisions with objects such as poles or street signs.

In an embodiment, the upper load path structure 12 may be configured to receive (i.e., controllably absorb and/or transfer to the vehicle) an amount of energy similar to that of the lower load path structure 14. In an embodiment, an over-riding event may be discouraged or prevented if the upper load path structure 12 is configured to receive an amount of energy that is at least 15-20% of the energy received by the lower load path structure 14.

As illustrated in FIG. 1, in an embodiment, the upper load path may resemble an arch-shaped structure. Such a design, while not specifically necessary, may further aid in efficiently transferring an impact load from the upper radiator bar 20 through the first and second shotgun rails 16, 18. As shown in FIG. 1, the arch-shaped structure may be created by providing each shogun rail 16, 18 with a curved portion (e.g., curved portion 28 of the first shotgun rail 16) that bends in a direction extending toward the upper radiator bar 20.

When used in conjunction with the upper load path structure 12, the one or more vertical support elements (e.g., elements 30, 32) may additionally enhance a vehicle's crashworthiness by preventing the upper load path structure 12 from deforming upward or downward during an impact. Such an integration of the upper and lower load path structures may be particularly beneficial when, for example, the bumper/rail system of the impacting vehicle is not geometrically aligned with the bumper/rail system of the impacted vehicle.

To provide the above-mentioned structural qualities, the upper load path structure 12 may be constructed from a plurality of closed-section members and/or C-Channel members. A closed-section member may be characterized by a hollow, continuous (i.e., closed) cross-section, such as, for example and without limitation, a square-tube, rectangular-tube, or round-tube. In an embodiment, a closed-section member may be formed, for example, by an extruding process, hydro-forming process, or by affixing two or more "open" section elements together such that they collectively form a closed-section. Likewise, a C-Channel member may be characterized by a hollow cross-section having a generally square or rectangular shape, where one side is open or substantially open (i.e., the cross-section of the member may resemble a letter "C").

Figure 2:
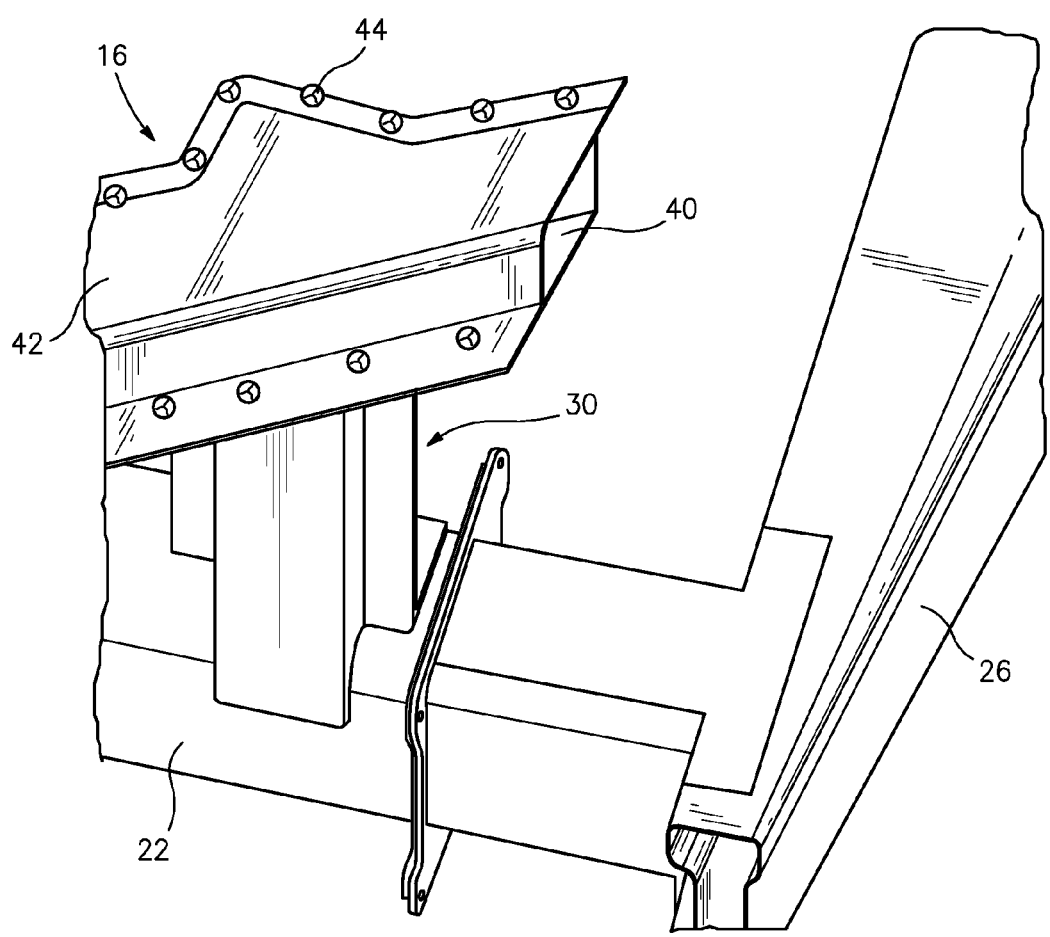
FIG. 2 is an isometric view of a portion of an automotive vehicle front end assembly, and illustrates, among other things, a two-piece shotgun rail.

In an embodiment, as generally illustrated in FIG. 2, a shotgun rail (e.g., shotgun rail 16) may be a closed-section rail that is formed from a shotgun inner member 40 and an shotgun outer member 42. In an embodiment, the shotgun inner member 40 and the shotgun outer member 42 may be metal components, shaped through a stamping process, and affixed together using, for example, a plurality of spot-welds (e.g. spot weld 44). Alternatively, other welding, brazing, gluing, or bolting techniques may be used to affix the inner and outer members.

Figure 3:
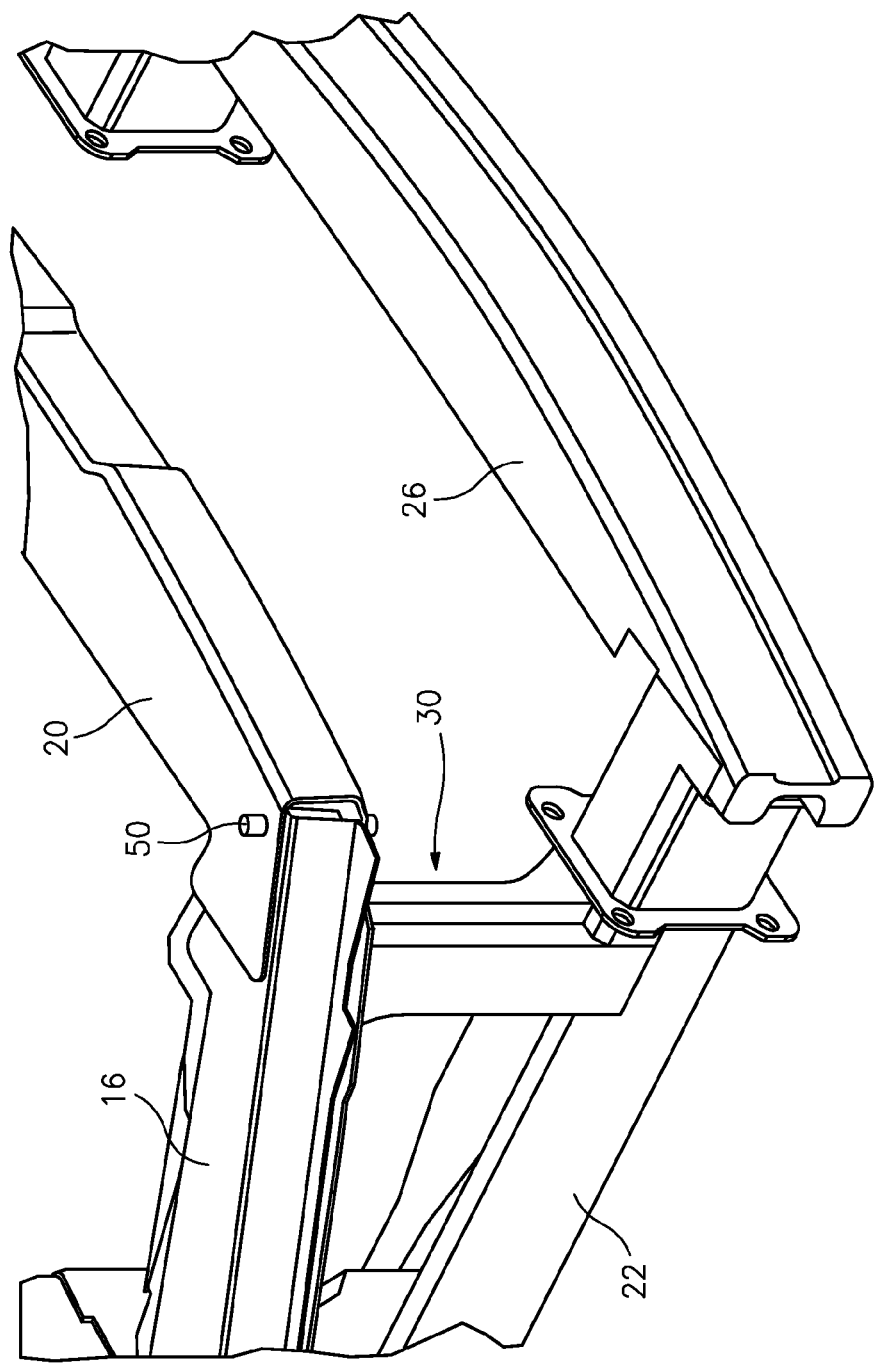
FIG. 3 is an isometric view of a portion of an automotive vehicle front end assembly, and illustrates, among other things, a radiator support to shotgun rail joint.
Figure 4:
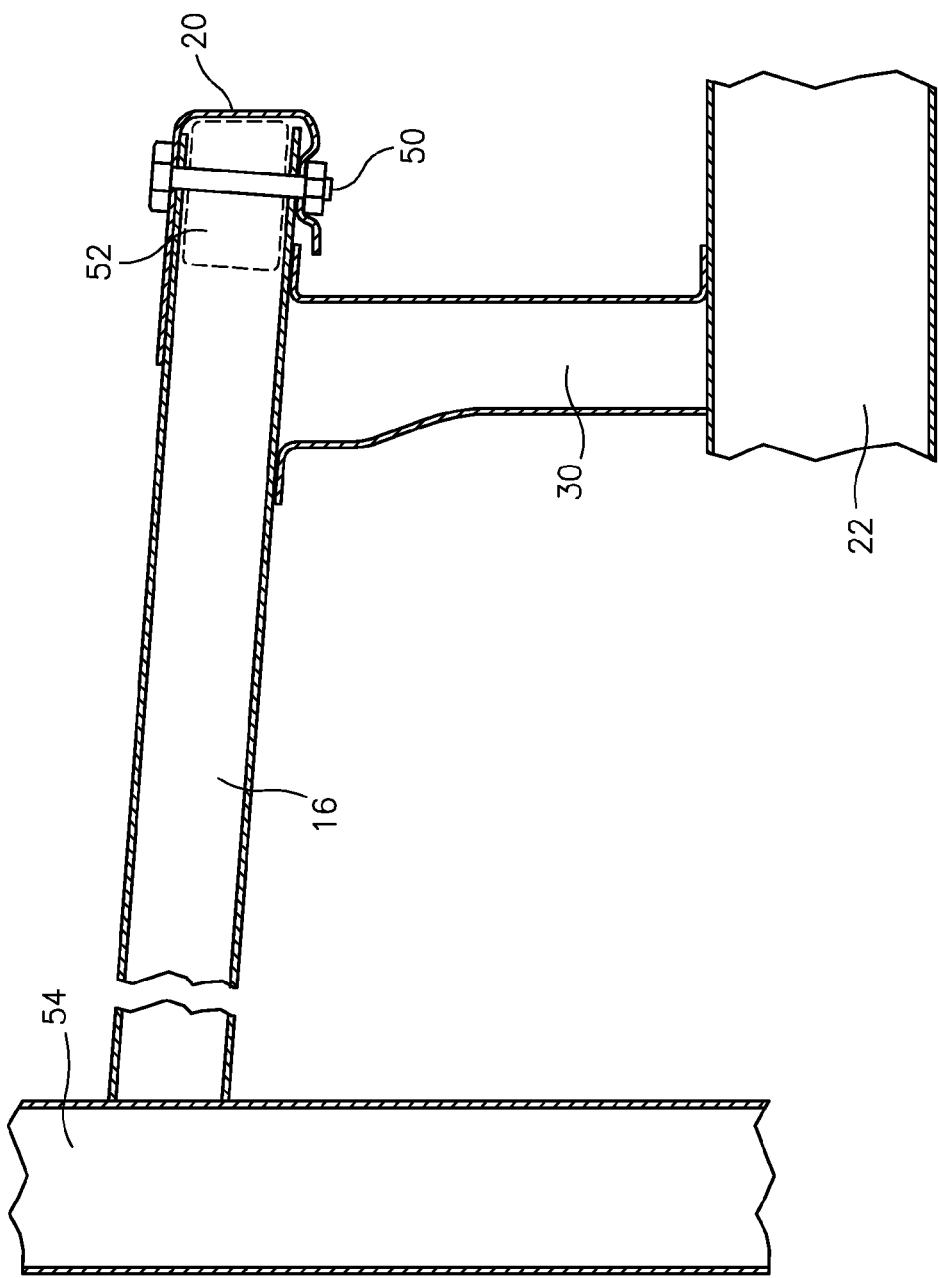
FIG. 4 is an cross sectional view of a portion of an automotive vehicle front end assembly.

As generally illustrated in FIGS. 3 and 4, the upper radiator support 20 may comprise a C-Channel element that is configured to fit over a portion of each of the first and second shotgun rails 16, 18. In an embodiment, the upper radiator support 20 may be affixed to the shotgun rails 16, 18 through a welding process. In another embodiment, the upper radiator support may be affixed to the shotgun rails 16, 18 by passing a bolt 50 through two walls of the upper radiator bar 20, as well as through two walls of the shotgun rail (e.g. shotgun rail 16). Additionally, one or more of the bolt openings in the upper radiator bar 20 and/or shotgun rail 16 may be a slotted opening to allow the radiator bar 20 a small degree of movement (i.e., less than 1") to accommodate dimensional variations in the frame assembly.

In an embodiment, the upper radiator bar 20 may be configured to accommodate an insert 52 within a portion of the length bar, as generally shown in the cross sectional view of FIG. 4 (taken along a portion of shotgun rail 16). The insert may, for example, extend throughout the entire length the bar between the first and second shotgun rails 16, 18, or may alternatively extend through only a portion of the bar. The insert 52 may be configured to fill a substantial majority of the hollow interior of the radiator bar 20, and may provide enhanced transverse stability to the bar. In an embodiment, the insert 52 may be a plastic insert. In another embodiment, the insert 52 may be a rubber or foam insert.

As further illustrated in FIG. 4, each of the first and second upper shotgun rails 16, 18 may be affixed to a portion of the vehicle body structure 54, such as, for example, the A-pillar, or other body structure substantially aligned or connected with the A-pillar. As generally known in the art, the A-pillar is a portion of the vehicle body structure that vertically extends on either side of the windshield that structurally supports the vehicle roof. Body structure substantially aligned or connected with the A-pillar may likewise include the portion of the vehicle body structure below the A-pillar that supports the forward vehicle doors. Such a frame connection may allow any impact energy to be transferred through the shotgun rails 16, 18 to the remainder of the vehicle.

In an embodiment, the one or more vertical support elements (e.g., support elements 30, 32) may be closed-section elements. Similar to the construction of the shotgun rail illustrated in FIG. 2, a closed-section vertical support element may be formed from an inner vertical support element 60 (illustrated in FIG. 5), and an outer vertical support element 62 (illustrated in FIG. 6). In an embodiment, each of the inner and outer vertical support elements 60, 62 may be formed through a sheet metal stamping process, and may be affixed together through, for example, a plurality of spot welds (such as spot weld 64). Alternatively, the stamped portions may be joined using other known affixing means.

Figure 5:
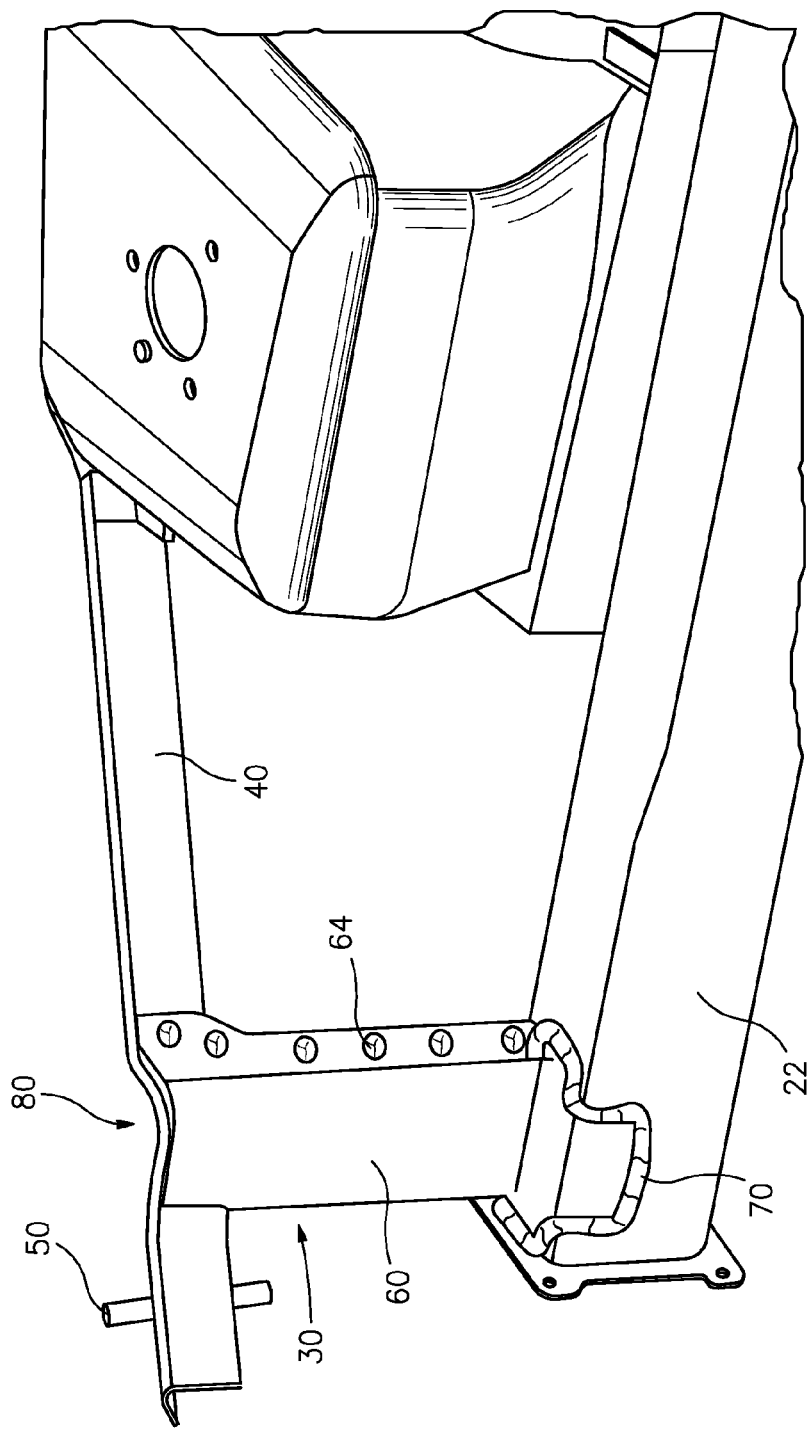
FIG. 5 is an isometric view of a portion of an automotive vehicle front end assembly, illustrating, among other things, an inner portion of a vertical support and shotgun rail.
Figure 6:
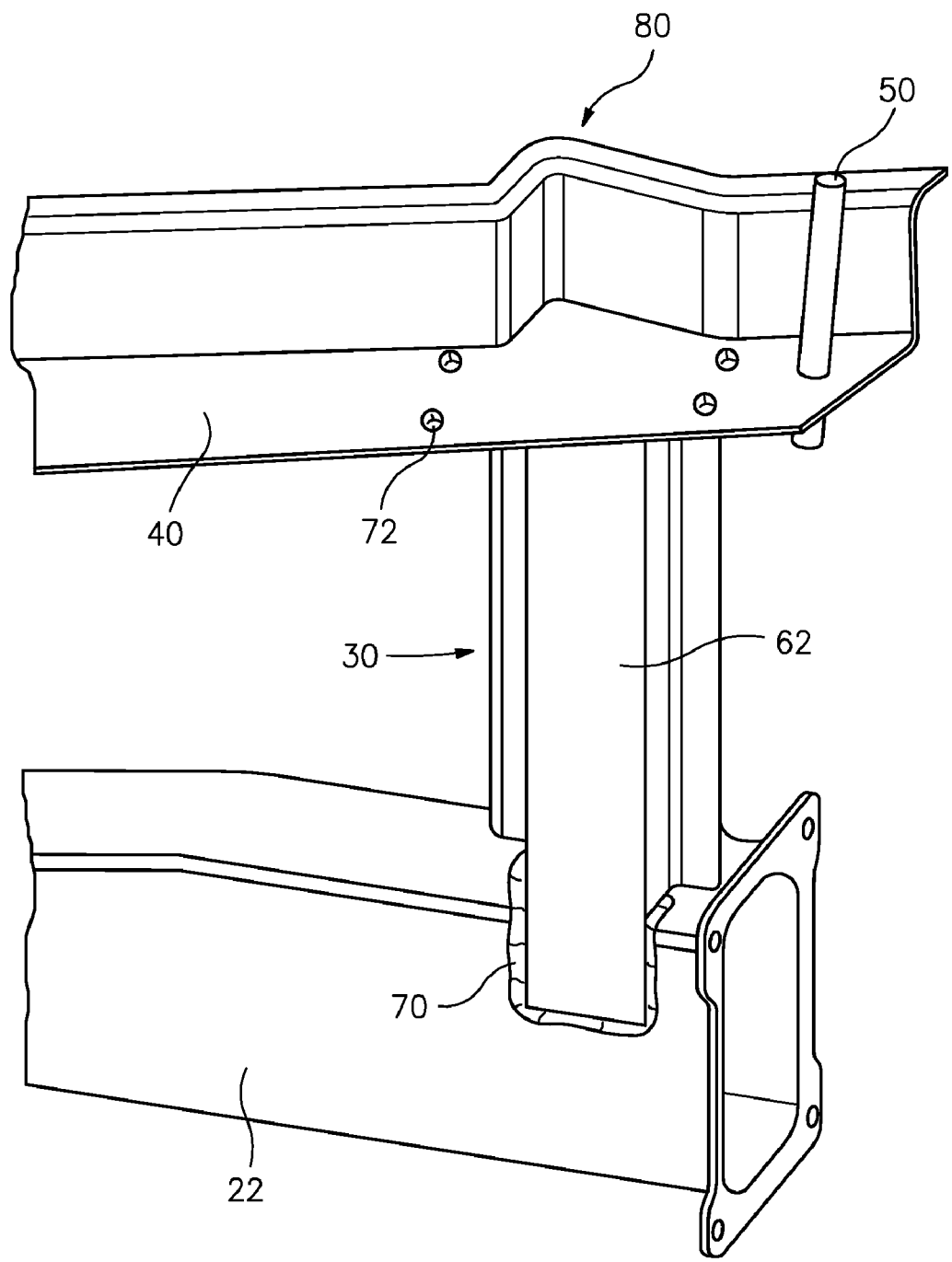
FIG. 6 is a isometric view of a portion of an automotive vehicle front end assembly, and illustrates, among other things, an inner portion of a vertical support and shotgun rail.

The one or more vertical support elements (e.g., support elements 30, 32) may be affixed to the upper load path structure 12 through a structural attachment with, for example, a shotgun rail (e.g. shotgun rail 16). Additionally, the one or more vertical support elements may be affixed to the lower load path structure 14 through a structural attachment with, for example, a vehicle side rail (e.g. side rail 22). In an embodiment, as shown in FIG. 5, one method of attachment to a side rail or shotgun rail may include, for example, a fusion weld 70. Alternatively, as shown in FIG. 6, another method of attachment may include one or more spot welds (e.g., spot weld 72).

To aid in the repeatable assembly of the vertical support elements to the upper load path structure 12, each of the shotgun rails 16, 18 may be provided with a locating feature that is configured to mate with a similar locating feature of the vertical support element. In an embodiment, the locating feature may be a V-shaped feature 80. Alternatively, the locating feature may include a post and mating hole, or other similar physical features that may ensure repeatable assembly. In an embodiment, the V-shaped feature 80 is stamped into the shotgun inner member 40, and a similar V-shaped feature 80 is stamped into correspondingly into the inner vertical support element 60.

While numerous embodiments of this disclosure have been described above with a certain degree of particularity, those skilled in the art could make numerous alterations to the disclosed embodiments without departing from the spirit or scope of the invention. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other, unless explicitly specified as such. It is intended that all matter contained in the above description or shown in the accompanying drawings shall be interpreted as illustrative only and not limiting. Changes in detail or structure may be made without departing from the spirit of the invention as defined in the appended claims.

What is claimed:

1. A structure for transferring energy during an automotive front end impact comprising:
   an upper load path structure including a first shot gun rail a second shotgun rail and an upper radiator bar extending therebetween, the upper radiator bar comprises a closed-section or C-Channel element;
   a lower load path structure including a first side rail a second side rail and a lower support member extending therebetween; and
   an insert provided within a portion of the upper radiator bar;
   wherein the upper radiator bar is configured to transfer energy to the first and second shotgun rails during an impact, the first and second shotgun rails, and first and second side rails comprise closed-section elements, and the lower support member is configured to transfer energy to the first and second side rails during an impact.

2. A structure for transferring energy during an automotive front end impact comprising:
   an upper load path structure including a first shot gun rail and a second shotgun rail and an upper radiator bar extending therebetween;
   a lower load path structure including a first side rail, a second side rail and a lower support member extending therebetween; and
   wherein the upper radiator bar is configured to transfer energy to the first and second shotgun rails during an impact, the lower support member is configured to transfer energy to the first and second side rails during an impact and each of the first and second shotgun rails of the upper load path structure includes a curved portion extending toward the upper radiator bar.

3. A radiator support structure for a vehicle comprising:
   a first and second shotgun rail;
   a first and second side rail;
   a first vertical support element extending between the first shotgun rail and the first side rail;
   a second vertical support element extending between the second shotgun rail and the second side rail; and
   an upper radiator bar extending between the first shotgun rail and the second shotgun rail, the upper radiator bar configured to transfer energy to the first and second shotgun rails during an impact; wherein the upper radiator bar comprises a C-Channel element configured to fit over a portion of a shotgun rail.

4. The radiator support structure of claim 3, wherein the upper radiator bar is configured to be affixed to the shotgun rail using a bolt that passes through two walls of the upper radiator bar and two walls of the shotgun rail.

5. The radiator support structure of claim 3, further comprising an insert provided within a portion of the upper radiator bar.

6. A radiator support structure for a vehicle comprising:
   a first and second shotgun rail;
   a first and second side rail;
   a first vertical support element extending between the first shotgun rail and the first side rail;
   a second vertical support element extending between the second shotgun rail and the second side rail; and
   an upper radiator bar extending between the first shotgun rail and the second shotgun rail, the upper radiator bar configured to transfer energy to the first and second shotgun rails during an impact;
   wherein each of the first and second shotgun rails include a locating feature configured to mate with a similar locating feature on the respective first and second vertical support elements.

7. A radiator support structure for a vehicle comprising:
   a first and second shotgun rail;
   a first and second side rail;
   a first vertical support element extending between the first shotgun rail and the first side rail;
   a second vertical support element extending between the second shotgun rail and the second side rail; and
   an upper radiator bar extending between the first shotgun rail and the second shotgun rail, the upper radiator bar configured to transfer energy to the first and second shotgun rails during an impact;
   wherein each of the first and second shotgun rails include a curved portion extending toward the upper radiator bar.

* * * * *